(12) United States Patent
Lindberg et al.

(10) Patent No.: US 12,423,537 B2
(45) Date of Patent: Sep. 23, 2025

(54) MARKED CONSUMABLE READING

(71) Applicant: ESAB AB, Gothenburg (SE)

(72) Inventors: Johan Lindberg, Gothenburg (SE); Jan Zachrisson, Nödinge (SE)

(73) Assignee: ESAB AB, Gothenburg (SE)

( * ) Notice: Subject to any disclaimer, the term of this patent is extended or adjusted under 35 U.S.C. 154(b) by 0 days.

(21) Appl. No.: 18/600,105

(22) Filed: Mar. 8, 2024

(65) Prior Publication Data

US 2024/0211708 A1 Jun. 27, 2024

Related U.S. Application Data

(63) Continuation of application No. PCT/IB2022/058474, filed on Sep. 8, 2022.

(60) Provisional application No. 63/242,808, filed on Sep. 10, 2021.

(51) Int. Cl.
*G06K 7/14* (2006.01)

(52) U.S. Cl.
CPC .................................. *G06K 7/1413* (2013.01)

(58) Field of Classification Search
CPC ...... G06K 7/1413; G06K 7/1417; G06K 7/14; G06K 7/1447
USPC ............................ 235/462.01, 454, 494, 375
See application file for complete search history.

(56) References Cited

U.S. PATENT DOCUMENTS

| | | |
|---|---|---|
| 6,267,291 B1 | 7/2001 | Blankenship et al. |
| 6,510,984 B2 | 1/2003 | Blankenship et al. |
| 6,536,660 B2 | 3/2003 | Blankenship et al. |
| 6,563,085 B2 | 5/2003 | Lanouette et al. |
| 6,708,877 B2 | 3/2004 | Blankenship et al. |
| 6,852,949 B2 | 2/2005 | Lanouette et al. |
| 6,858,817 B2 | 2/2005 | Blankenship et al. |
| 6,940,039 B2 | 9/2005 | Blankenship et al. |
| 7,015,419 B2 | 3/2006 | Hackl et al. |
| 7,032,814 B2 | 4/2006 | Blankenship |
| 7,335,854 B2 | 2/2008 | Hutchison |
| 7,645,960 B2 | 1/2010 | Stava |
| 7,761,336 B1 | 7/2010 | Blankenship et al. |
| 7,999,209 B2 | 8/2011 | Diekmann et al. |
| 8,658,250 B2 | 2/2014 | Batchelder et al. |
| 8,658,941 B2 | 2/2014 | Albrecht |
| 8,686,318 B2 | 4/2014 | Albrecht et al. |
| 9,129,330 B2 | 9/2015 | Albrecht et al. |

(Continued)

FOREIGN PATENT DOCUMENTS

| | | |
|---|---|---|
| EP | 0878263 B1 | 8/2002 |
| EP | 2855065 B1 | 8/2020 |

(Continued)

OTHER PUBLICATIONS

Notification of Transmittal of International Search Report and Written Opinion including International Search Report and Written Opinion for International Application No. PCT/IB2022/058474 dated Nov. 25, 2022, 12 pages.

*Primary Examiner* — Edwyn Labaze
(74) *Attorney, Agent, or Firm* — Edell, Shapiro & Finnan, LLC

(57) ABSTRACT

Techniques for automatic reading of marked consumables are disclosed. The techniques involve a reader having a plurality of sensors for receiving a marked consumable and detecting includes markings on the consumable, regardless of the orientation of the consumable to the reader.

20 Claims, 12 Drawing Sheets

(56) References Cited

U.S. PATENT DOCUMENTS

| | | |
|---|---|---|
| 9,144,862 B2 | 9/2015 | Hemmert |
| 9,144,882 B2 | 9/2015 | Lindsay et al. |
| 9,162,313 B2 | 10/2015 | Enyedy |
| 9,395,715 B2 | 7/2016 | Brandt et al. |
| 9,446,471 B2 | 9/2016 | Hillen et al. |
| 9,545,683 B2 | 1/2017 | Ruehrnoessl et al. |
| 9,672,460 B2 | 6/2017 | Hoffa et al. |
| 9,687,930 B2 | 6/2017 | Hillen et al. |
| 9,713,852 B2 | 7/2017 | Becker et al. |
| 9,737,954 B2 | 8/2017 | Hoffa et al. |
| 9,782,852 B2 | 10/2017 | Mao et al. |
| 9,855,679 B2 | 1/2018 | Batchelder et al. |
| 9,862,049 B2 | 1/2018 | Becker |
| 10,010,959 B2 | 7/2018 | Daniel |
| 10,058,948 B2 | 8/2018 | Temby et al. |
| 10,213,864 B2 | 2/2019 | Albrecht |
| 10,278,274 B2 | 4/2019 | Sanders et al. |
| 10,346,647 B2 | 7/2019 | Hoffa et al. |
| 10,373,517 B2 | 8/2019 | Becker et al. |
| 10,380,911 B2 | 8/2019 | Hsu et al. |
| 10,402,959 B2 | 9/2019 | Becker et al. |
| 10,455,682 B2 | 10/2019 | Shipulski et al. |
| 10,482,788 B2 | 11/2019 | Becker et al. |
| 10,486,260 B2 | 11/2019 | Hoffa et al. |
| 10,625,359 B2 | 4/2020 | Nadler et al. |
| 10,897,693 B2 | 1/2021 | Hillen et al. |
| 11,103,948 B2 | 8/2021 | Holverson |
| 11,181,891 B2 | 11/2021 | Kooken et al. |
| 2006/0070987 A1 | 4/2006 | Daniel |
| 2006/0157461 A1 | 7/2006 | Diekmann et al. |
| 2006/0207981 A1 | 9/2006 | Diekmann et al. |
| 2007/0093717 A1* | 4/2007 | Nagar .................... A61B 5/489 |
| | | 600/438 |
| 2011/0117268 A1 | 5/2011 | Batchelder et al. |
| 2014/0048524 A1 | 2/2014 | Ash et al. |
| 2015/0069031 A1 | 3/2015 | Ruehrnoessl |
| 2015/0158109 A1* | 6/2015 | Chantry ............... B23K 9/0953 |
| | | 219/121.55 |
| 2015/0332071 A1 | 11/2015 | Hoffa et al. |
| 2017/0003372 A1* | 1/2017 | Antoina .................. G01S 3/783 |
| 2017/0042012 A1 | 2/2017 | Sanders et al. |
| 2017/0124360 A1 | 5/2017 | Young, Jr. et al. |
| 2017/0165779 A1 | 6/2017 | Barhorst et al. |
| 2017/0173735 A1 | 6/2017 | Hsu |
| 2018/0361492 A1 | 12/2018 | Temby et al. |
| 2019/0072941 A1 | 3/2019 | Kooken et al. |
| 2019/0303629 A1 | 10/2019 | Hoffa et al. |
| 2019/0358730 A1 | 11/2019 | Nadler et al. |
| 2019/0362646 A1 | 11/2019 | Hsu et al. |
| 2020/0016677 A1 | 1/2020 | Nadler et al. |
| 2020/0139477 A1 | 5/2020 | Nadler et al. |
| 2020/0310383 A1 | 10/2020 | Holverson |
| 2021/0346975 A1 | 11/2021 | Holverson |
| 2022/0305579 A1* | 9/2022 | Weeks ................ B23K 9/1336 |

FOREIGN PATENT DOCUMENTS

| | | |
|---|---|---|
| WO | 9847209 A1 | 10/1998 |
| WO | 0236296 A1 | 5/2002 |
| WO | 2004105990 A1 | 12/2004 |
| WO | 2006095275 A2 | 9/2006 |

* cited by examiner

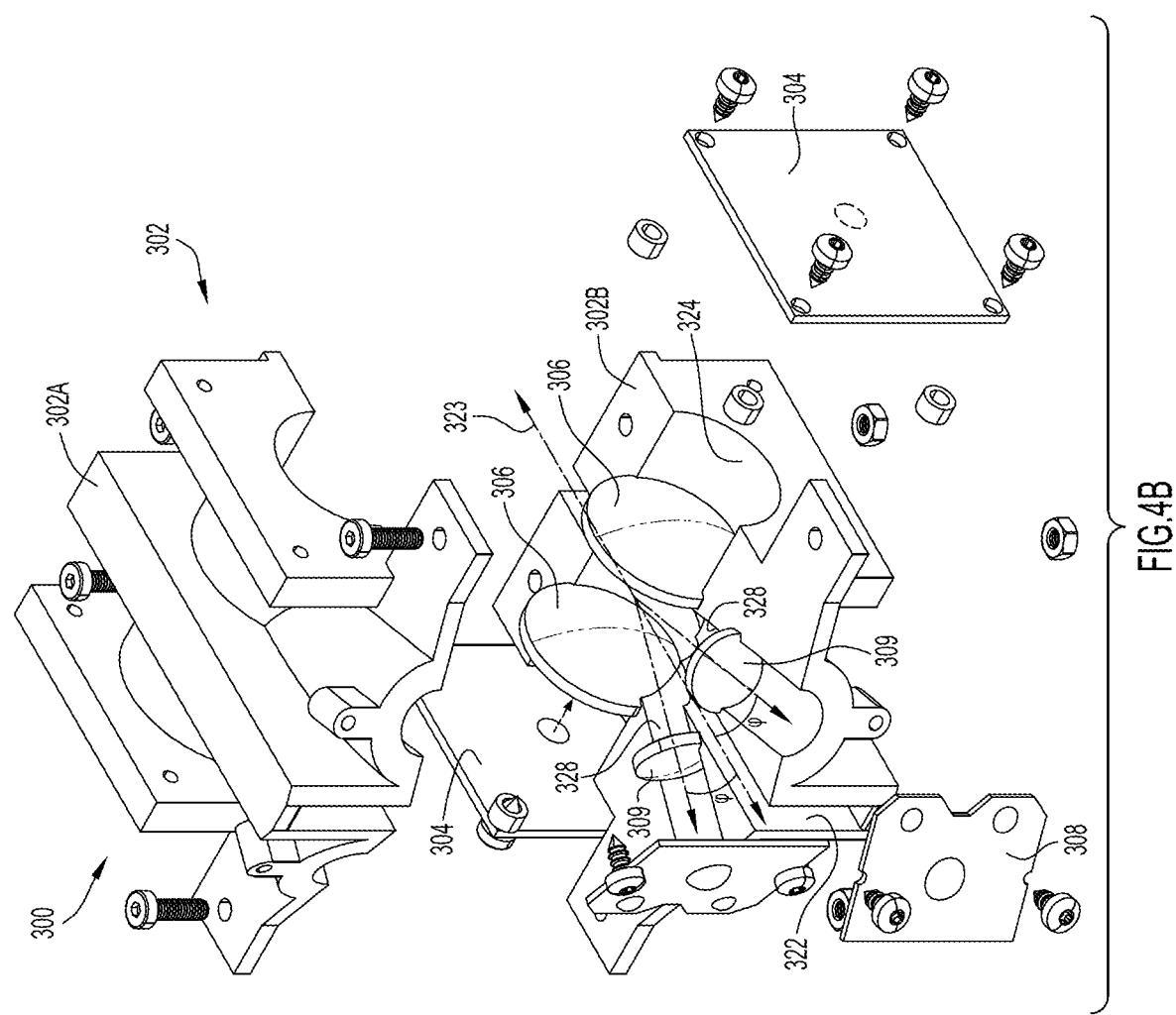

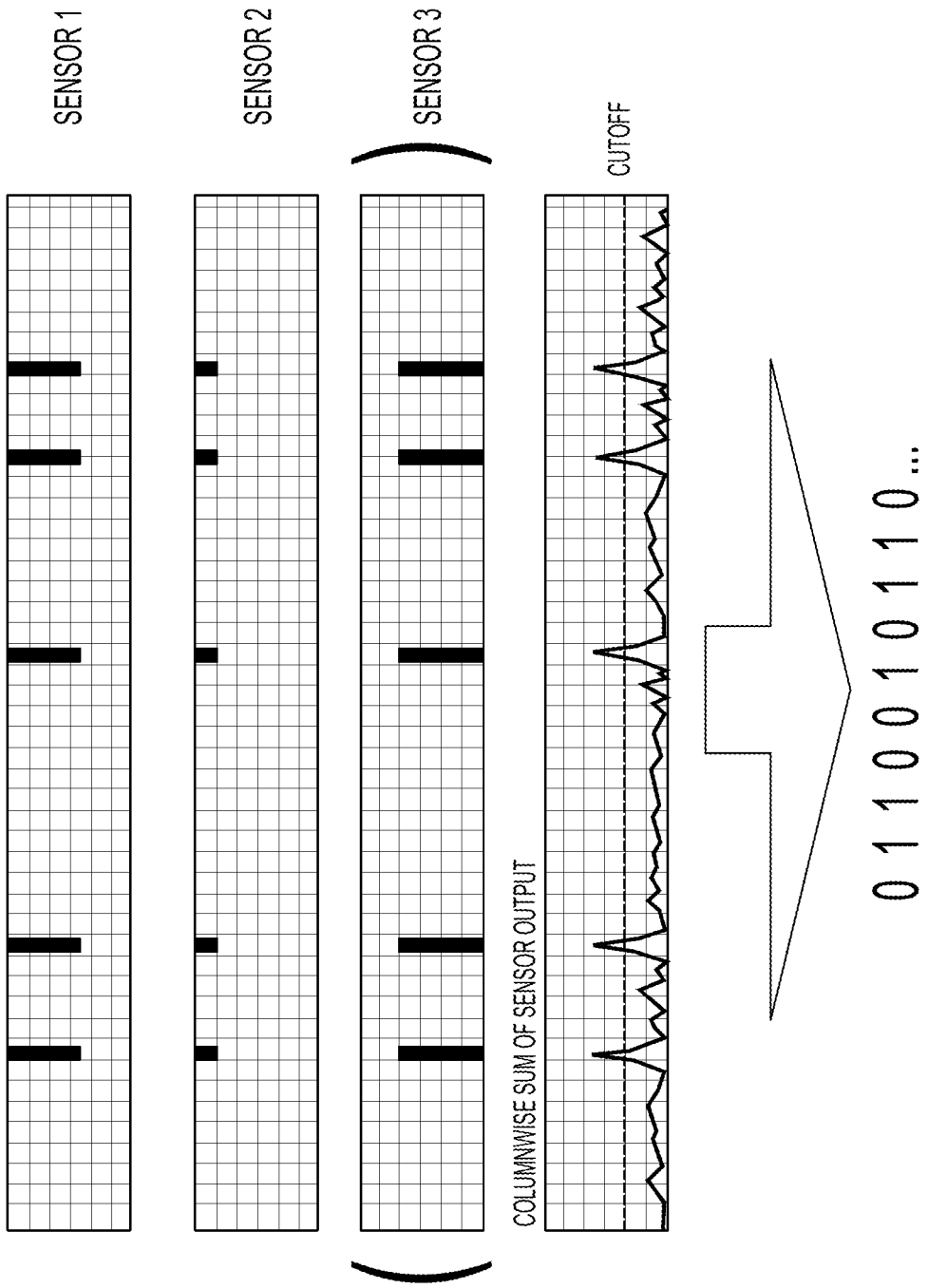

MARKED CONSUMABLE READING

CROSS-REFERENCE TO RELATED APPLICATION

This application is a continuation of PCT International Application No. PCT/IB2022/058474, filed Sep. 8, 2022, entitled "Marked Consumable Reading," which claims priority to U.S. Provisional Application No. 63/242,808, filed Sep. 10, 2021, the entirety of which is incorporated herein by reference.

FIELD OF INVENTION

The present invention relates to sensing consumables and, in particular, to a reader or sensor module for scanning/reading a marked consumable to identify and/or track usage of the marked consumable.

BACKGROUND

Generally, welding operations feed a consumable, (e.g., metal wire, metal strip, or other type of coiled or spooled stock) through a cable to a torch via a feeder. The torch receives and conducts a process current from a power source to the consumable. The current creates an arc from a tip of the consumable to a workpiece, which causes the consumable to be deposited onto and fused with the workpiece to create a weld. Typically, the consumable is supplied from a carrier (e.g., a spool or a coil disposed in a bulk container). However, during operation, the amount of length of a consumable remaining in the spool or coil may be difficult to determine without stopping the welding operation and directly inspecting the carrier. Consequently, a user may not know whether there is enough consumable supply remaining in the carrier to complete a welding operation.

Moreover, weld settings are often set based on consumable properties, but these properties are often identified, at least in part, by user actions (e.g., by visual inspection). For example, often, a user must read manufacturer markings, determine appropriate settings (e.g., by consulting a manual) and set a power source accordingly. Alternatively, a user might scan a consumable marking (e.g., a bar code) prior to arc processing operations, but if the user forgets to scan the consumable, arc processing operations will use parameters appropriate for the last scanned consumable.

Techniques that overcome the above noted issues are desirable.

SUMMARY

In some aspects, the techniques described herein relate to a reader for detecting marks on a consumable wire including a reader housing defining a wire channel; a first sensor disposed toward a first side of the wire channel; and a second sensor disposed toward a second side of the wire channel, opposite the first side. The first sensor and the second sensor are configured to detect marks on a wire when light is incident on the wire.

In another implementation, the techniques described herein relate to a system including a plurality of sensors disposed radially about a wire channel; a plurality of light channels configured to guide light to the wire channel; and a controller electrically coupled to the plurality of sensors. The plurality of sensors are configured to aggregate signal outputs of the sensors and convert the aggregated signal outputs into encoded information.

In yet another instance, the techniques described herein relate to a method of determining encoded information from a marked wire including detecting, via a plurality of sensors, marks on a wire traveling through a reader; outputting sensor signals from the plurality of sensors to a controller; aggregating, via the controller, the sensor signals from the plurality of sensors; and determining encoded information representative of a characteristic of the wire.

BRIEF DESCRIPTION OF THE DRAWINGS

To complete the description and in order to provide for a better understanding of the present invention, a set of drawings is provided. The drawings form an integral part of the description and illustrate an embodiment of the present invention, which should not be interpreted as restricting the scope of the invention, but just as an example of how the invention can be carried out. The drawings comprise the following figures:

FIG. 4B is an exploded view of the reader of FIG. 4A.

FIG. 5C is a diagrammatic depiction of a method for determining markings on a wire using multiple sensors, according to an example embodiment.

DETAILED DESCRIPTION

Figure 1A:
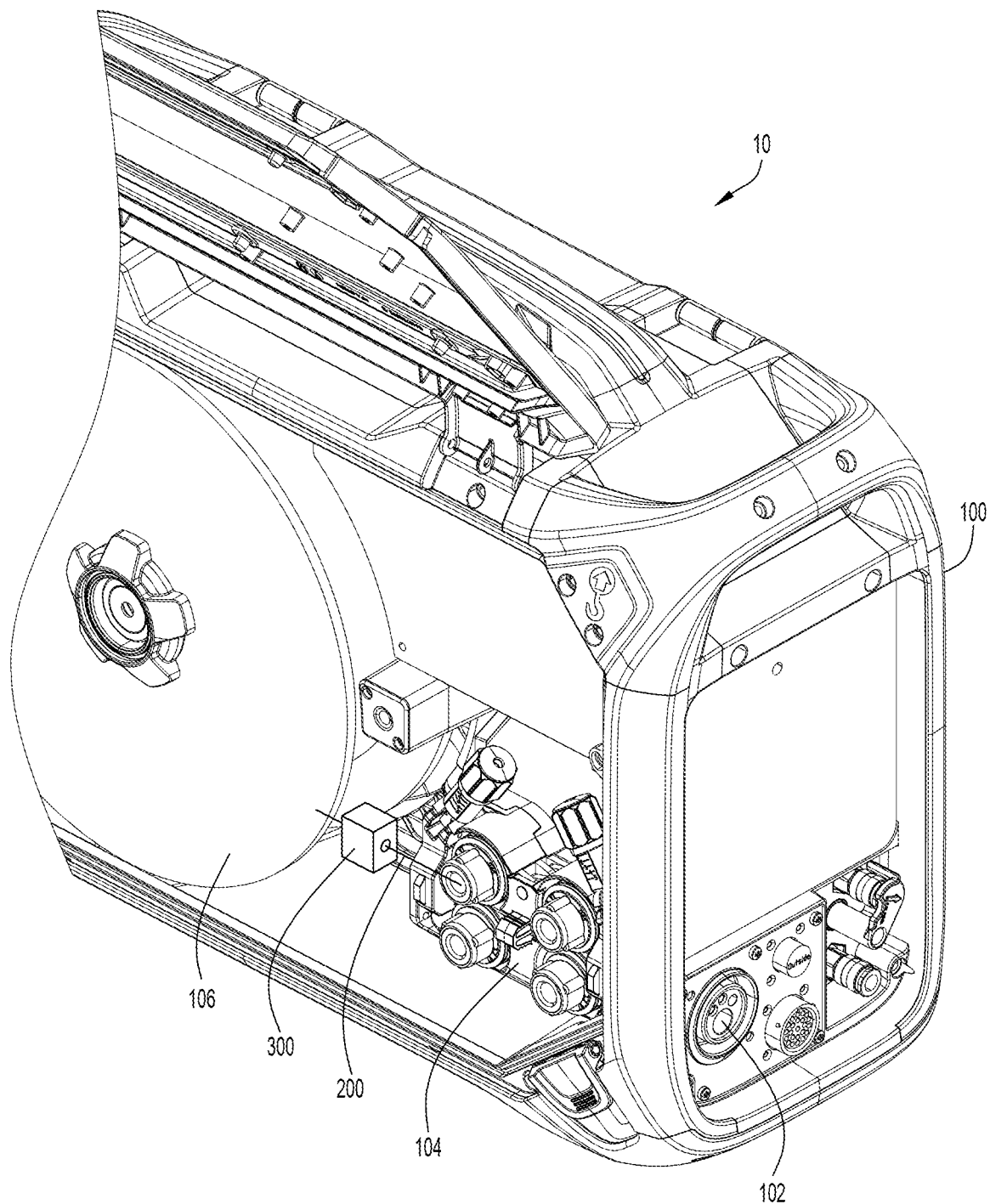
FIG. 1A is an illustration of a power source having a reader, according to an example embodiment.

The following description is not to be taken in a limiting sense but is given solely for the purpose of describing the broad principles of the invention. Embodiments of the invention will be described by way of example, with reference to the above-mentioned drawings showing elements and results according to the present invention.

Generally, the consumable tracking techniques presented herein, which may be embodied as a system and method for automatic tracking of a consumable, involve a marked consumable and a reader (e.g., sensor module and/or reading unit) capable of reading the markings on the consumable. When the marked consumable is fed through the reader presented herein, the reader scans the marks indicative of information about the consumable. Then, the reader or a computing device operatively coupled thereto may determine parameters associated with the consumable, characteristics of the consumable, and/or the remaining length of the consumable in the consumable's carrier (e.g., spool, coil, carrier, and/or bulk container). In at least some instances, a welding system may determine appropriate welding settings (such as feed speed, gas settings, process power parameters including voltage and/or amperage, etc.), track how much consumable has been used, and/or track how much consumable is available based on the information determined from reading the consumable markings. The reader may be disposed inside a wire feeder housing, attached to an exterior of a wire feeder housing, disposed within a power source, or otherwise disposed between a consumable carrier and a torch.

The consumable presented herein is marked along its length during or subsequent to its production (e.g., with laser marking/etching). The marks may be specific to the spooled or coiled stock; designating characteristics such as consumable type, production lot, manufacturer, spool, and/or coil. The marks may also identify the remaining length of the consumable. More specifically, the consumable may be marked with identifying lines (e.g., similar to a bar code) that extend around a portion of the consumable. For example, the consumable may be a round wire, and the marking may extend along approximately 50% of the outer circumference of the wire. In some implementations, more or less than 50% of the circumference of the wire may be marked; however, marking the entire circumference may be difficult and, thus, less than the entirety of the circumference is marked in most embodiments. The marking may be laser etched, laser ablated and/or otherwise engraved onto the consumable.

The reader presented herein has at least one optical sensor to detect the markings on the wire. The reader converts the detected markings into an encoded signal or data. The encoded signal may contain information about the consumable, such as a wire type, wire manufacturer, authenticating information, remaining amount of wire from supply (e.g., length). In some implementations, the encoded signal may be transmitted to a power source for decoding the signal. In at least some embodiments, the power source may set weld parameters and/or determine a remaining amount of wire based on the information encoded in the signal. Additionally, or alternatively, in some embodiments, the power source may only supply power when the information encoded in the signal indicates the consumable wire is authentic and/or approved for use with the power source, and/or for use in the instant weld, e.g., as prescribed by a certain welding procedure specification ("WPS"). Still further, the encoded information can track wire usage and can be used to help order new wire and/or to alert a welder whether enough wire is left for a job (among other uses).

Typically, when wire is dispensed from a carrier (e.g., spool or coil), the wire may twist. Thus, the markings may not be consistently aligned with a single optical sensor aligned to read markings disposed in a particular angular orientation as the wire passes through the reader. That is, if a reader includes a single optical sensor, the marked portion of the wire may face away from the sensor. Consequently, the reader may not detect the marking. The system for automatic tracking of consumable usage as presented herein overcomes this issue by arranging a plurality of optical sensors radially around a path of the consumable within the reader. Then, to read markings detected by a plurality of sensors, the techniques presented herein combine a plurality of sensor readings into an aggregated signal. Accordingly, the marking on the wire will be detected, with minimal noise and false readings, regardless of the orientation of the wire as it passes through the reader.

Figure 1B:
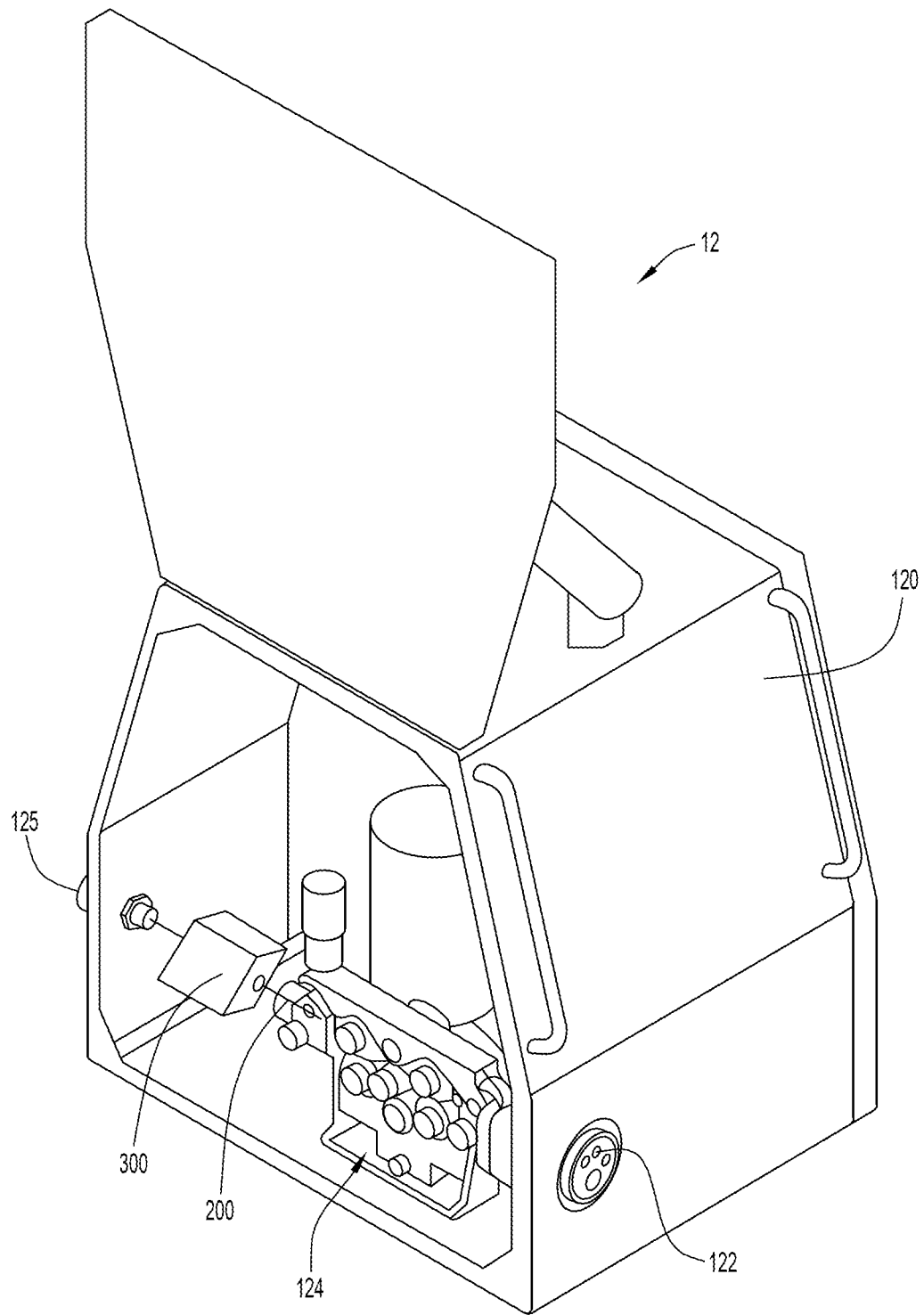
FIG. 1B is an illustration of a wire feeder having a reader, according to another example embodiment.
Figure 1C:
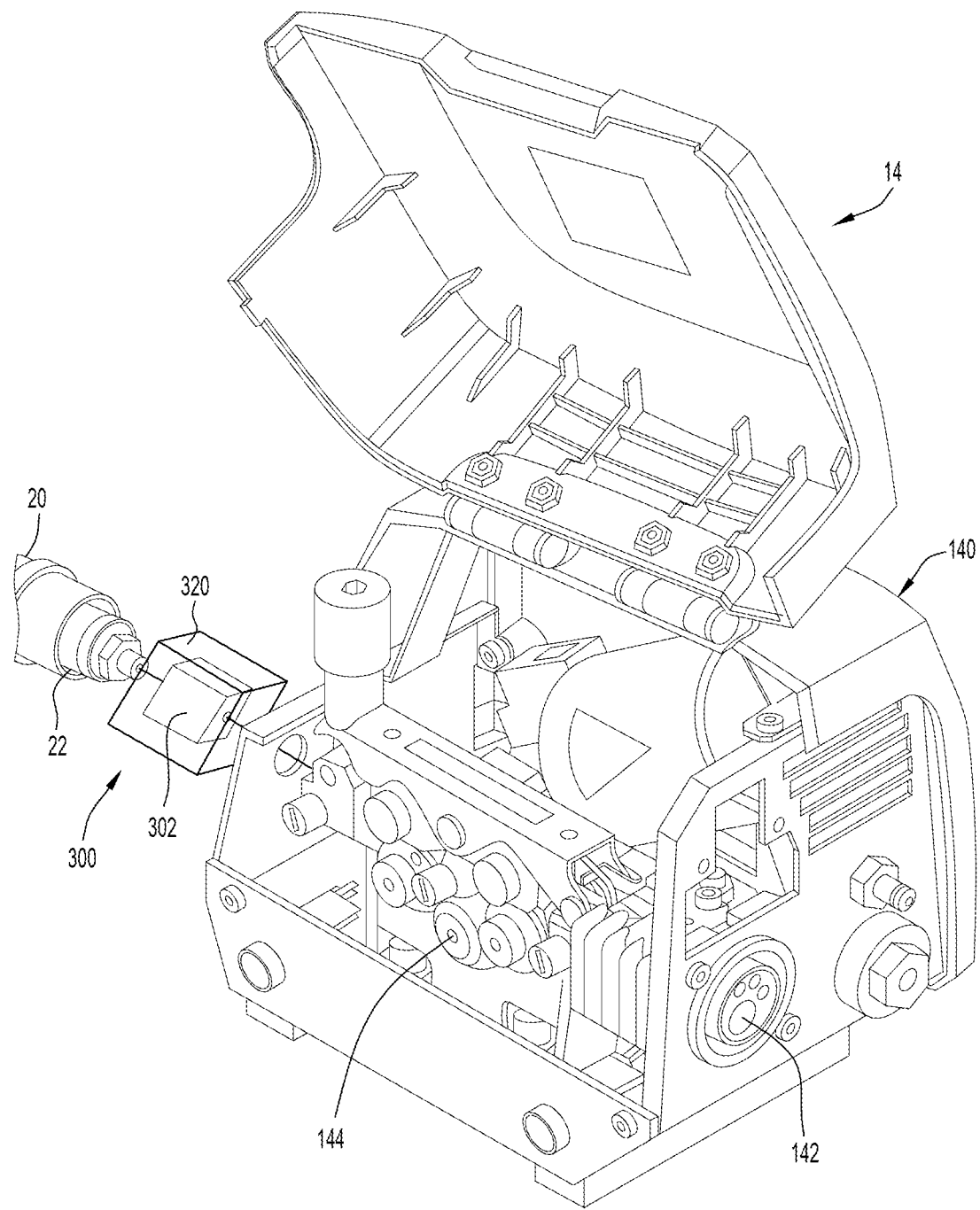
FIG. 1C is an illustration of another weld system component having a reader, according to yet another example embodiment.

Now referring to FIGS. 1A-1C, embodiments of a system for automatic tracking of consumable usage are illustrated. In FIG. 1A, a reader 300 is included in a wire feeder 10. The wire feeder 10 includes a housing 100 that houses a spool 106 for supplying a consumable (e.g., a wire 200) and a feeder unit 104 for pulling the wire 200 from the spool 106 and pushing the wire 200 through a housing outlet 102. The reader 300 is disposed between the spool 106 and feeder unit 104. In some implementations, the wire feeder 10 may also include components (not shown) for generating welding power (e.g., to be transmitted to a torch and/or the wire). For example, the power generation components may be positioned on a first lateral side of the feeder housing 100 while the spool 106, feeder unit 104, and reader 300 are disposed on a second lateral side of the wire feeder housing 100. Alternatively, a power source may include a wire feeder having the reader 300.

FIG. 1B is an illustration of another component/system that can include the reader/sensor module 300 presented herein. This component/system is a wire feeder 12 and includes a feeder housing 120 that houses a feeder unit 124 and the reader/sensor module 300. The feeder unit 124 pulls a consumable (e.g., wire 200) from an external carrier (e.g., spool or coil) into the feeder housing 120 via inlet 125, through the reader 300 and pushes the wire 200 out of the feeder outlet 122.

FIG. 1C is an illustration of another weld system component having a reader 300, according to another example embodiment. In this example, the reader 300 may include a casing 320 that surrounds a reader housing 302. The reader 300 defines a consumable inlet into a wire feeder 14 so that a consumable (e.g., wire 200) received from a carrier 20, via a carrier outlet 22, passes through the reader 300 when moving between the carrier 20 and the wire feeder housing 140. The feeder housing 140 includes an outlet 142 and a feeder unit 144 for pulling wire 200 from the carrier outlet 22, through the reader 300, into the housing 140, and for pushing the wire 200 out through the outlet 142. In some instances, the casing 320 of the reader 300 may be coupled, fixedly or releasably/removably, to the feeder housing 140.

In each embodiment shown in FIGS. 1A-1C, the wire 200 passes through the reader 300 to be scanned. Optical sensors disposed in the reader 300 scan the markings on the wire 200 as it passes through the reader 300. Moreover, in some embodiments, any reader 300, whether positioned inside or outside a welding system component (e.g., power source, wire feeder, etc.), can include an outer casing (e.g., 320 of FIG. 1C), regardless of the labeling of the examples shown in the Figures. A casing can protect the sensors within the reader 300 from contaminants of the ambient environment. In fact, in some instances, the reader 300 may be a closed unit, and may have a slight over-pressure therein to keep out dust and fumes. The arrangement of the sensors in the reader is discussed below with reference to FIGS. 3A-4D, 6, 7A, and 7B. Moreover, while embodiments are discussed below with reference to a round wire 200, the wire 200 may be representative of any welding consumable (e.g., metal wire, metal strip, or other type of coiled or spooled stock).

Figure 2:
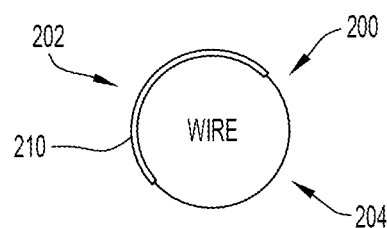
FIG. 2 illustrates a cross-sectional view of a wire having markings on a marked side, according to an example embodiment.

FIG. 2 illustrates a wire 200 having markings 210 on a marked side 202. In the illustrated embodiment, the marking 210 extends along approximately 50% of the wire's outer circumference, but this is merely an example, and, in other embodiments, the marking may extend along more or less than 50% of the wire's outer circumference. The markings 210 may be a bar code, matrix code, design, and/or array of shapes/characters laser etched or marked onto the wire 200 during manufacturing. Additionally, the wire 200 may be free of markings on the opposite side of the wire 200. That is, the opposite side of the marked side 202 defines an unmarked side 204 that may not be etched or otherwise marked.

Figure 3A:
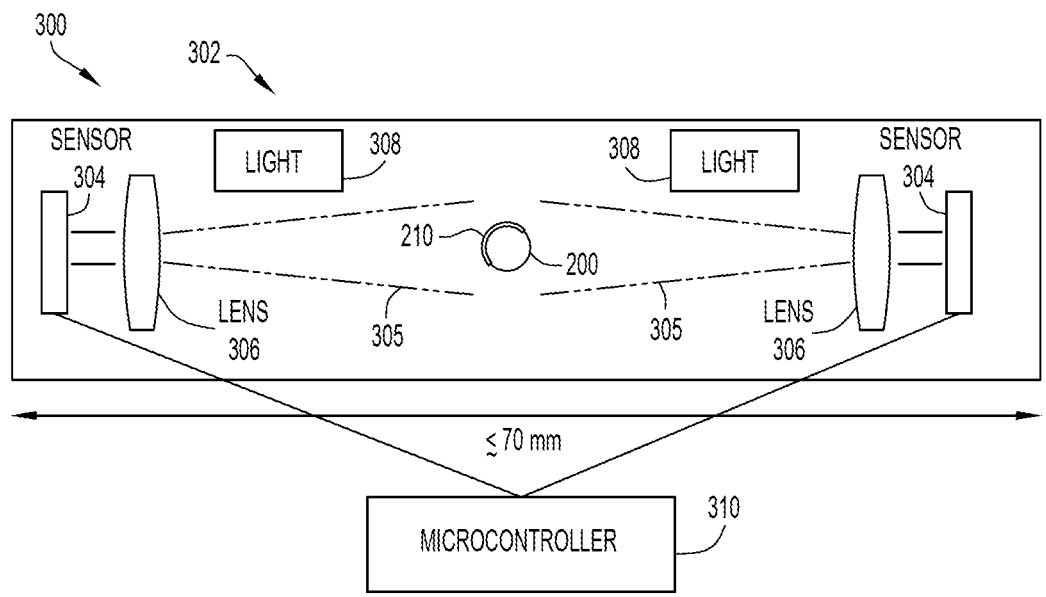
FIG. 3A illustrates a front, schematic view of the marked wire of FIG. 2 as it passes through a first example embodiment of a reader, according to an embodiment.
Figure 3B:
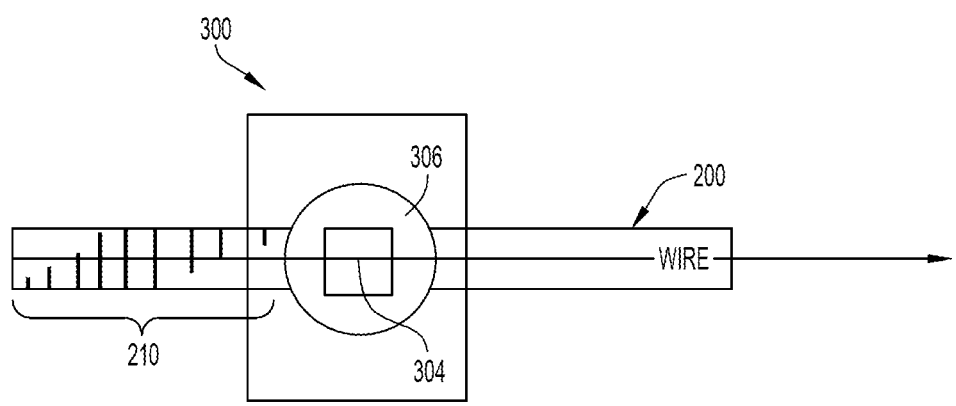
FIG. 3B illustrates a side view of the wire of FIG. 2 passing through the reader of FIG. 3A, taken from the perspective of one of the sensors included the reader.

FIGS. 3A and 3B illustrate the marked wire 200 of FIG. 2 as it passes through a first example reader 300. The first example reader 300 includes a reader housing 302 having at least one light source 308, two sensors 304 and two lenses 306. The light source 308, sensors 304 and lenses 306 may be disposed on one or more printed circuit boards (PCBs) (not shown) that support and electrically couple the sensors 304, the at least one light source 308, and a microcontroller 310 (e.g., a processor). As noted above, the reader 300 may include a closed sensor unit/module, possibly with a slight over-pressure therein to keep out dust and fumes. The at least one light source 308 creates lighting inside the reader 300 to be detected by the sensors 304 as it reflects off the markings 210 of the wire 200.

The reader 300 can be a stand-alone unit (e.g., FIG. 1C) or can be included in another component (e.g., a power source or a wire feeder, 10, 12, 14, as shown in FIGS. 1A and 1B). Overall, the lighting from the at least one light source 308 will allow all optical sensors 304 to read markings 210 on the wire 200. Meanwhile, the arrangement of the optical sensors 304 (e.g., evenly spaced or otherwise disposed radially around a wire path) ensures that the reader 300 can read a wire 200 fed therethrough regardless of the rotational orientation of the wire 200 (i.e., regardless of the angular orientation/position of a wire marking 210 with respect to the reader 300). Generally, the sensors 304 may be optical sensors configured to detect the markings 210 on the wire 200, and in some implementations, may include additional lenses.

Still referring to FIGS. 3A and 3B, the reader 300 includes inlets and outlets for receiving the marked wire 200. The inlet and outlet may, based on their positioning and orientation, define a path along which the wire passes through the reader 300. In some implementations, one or more PCBs hosting the light source 308, sensors 304 and/or lenses 306 are arranged perpendicularly to the marked wire as it passes through the reader 300 and include a hole for the weld wire 200 to pass through. In some implementations, the PCB may be arranged parallel to the marked wire 200 as it passes through the reader 300. In yet another implementation, the reader 300 includes a plurality of PCBs having sensors facing the marked wire 200 as it passes through the reader 300.

In the embodiment illustrated in FIG. 3A, the lenses 306 and sensors 304 are disposed on opposite sides of the reader 300, and a field of view 305 of each of the sensors 304 is aligned perpendicularly with a path of the weld wire 200. That is, the sensors 304 face each other, and the wire 200 passes between them. As the weld wire 200 passes through the reader 300, the light source 308 illuminates an outer surface of the wire 200 such that at least one sensor 304 can detect markings 210 on a first side of the wire 200 while the other sensor 304 can detect markings 210 on a second side of the wire 200 (as viewed from the reader 300). The lenses 306 focus light reflected from the wire 200 to their respective sensors 304. Each sensor 304 and lens 306 assembly is capable of reading approximately 50% of the circumference of the wire 200 to which they face. Therefore, an entirety of the outer circumference of the wire 200 may be scanned by the sensors 304 as depicted in FIG. 3A. In some implementations, the lenses 306 may be included in the sensor 304. Alternatively, the lenses 306 may be omitted.

As noted above, the markings 210 are disposed on one side 202 of the wire 200, however, as the wire 200 is fed from the carrier, the wire 200 may twist, rotate, or the marked side 202 may be otherwise out of alignment with one of the sensors 304. Thus, as is shown in FIG. 3B, only a portion of the markings 210 may pass through a field of view of one of the sensors 304. In this scenario, the remaining portion of the marking 210 passes through a field of view 305 the of the other sensor 304. For example, if the wire 200 is aligned with the reader 300 such that the marked side 202 faces down (or up), only about 50% of the marking 210 will pass through the field of view 305 of each sensor 304. That is, each sensor 304 will register only about 50% of the marking 210.

Additionally, or alternatively, the markings 210 may be twisted about the wire 200 in a helical manner. As the marked wire 200 passes through the field of view of each sensor 304, the sensors 304 will scan for at least a portion of the marking 210. That is, one sensor 304 may detect a portion of the marking 210, while the other sensor 304 will detect the remaining portion of the marking 210. In some instances, one sensor 304 will detect no portion of the marking 210, while the other sensor 304 will detect an entirety of the marking 210. For example, a first sensor 304 may detect 0-100% of a marking 210 while the second sensor 304 may detect 100-0% of the marking 210. The sensor signal or data is transmitted to the microcontroller 310, which sums the two signals from the sensors 304 to determine whether there is a marking 210 on the wire 200. In the depicted embodiment, the microcontroller 310 is depicted exteriorly of reader housing 302; however, in some implementations, the microcontroller 310 is also disposed on the one or more PCBs within the reader 300. In any case, the method for detecting markings 210 and encoding/decoding the wire markings 210 are discussed further below with reference to FIGS. 5A-5C.

Figure 4A:
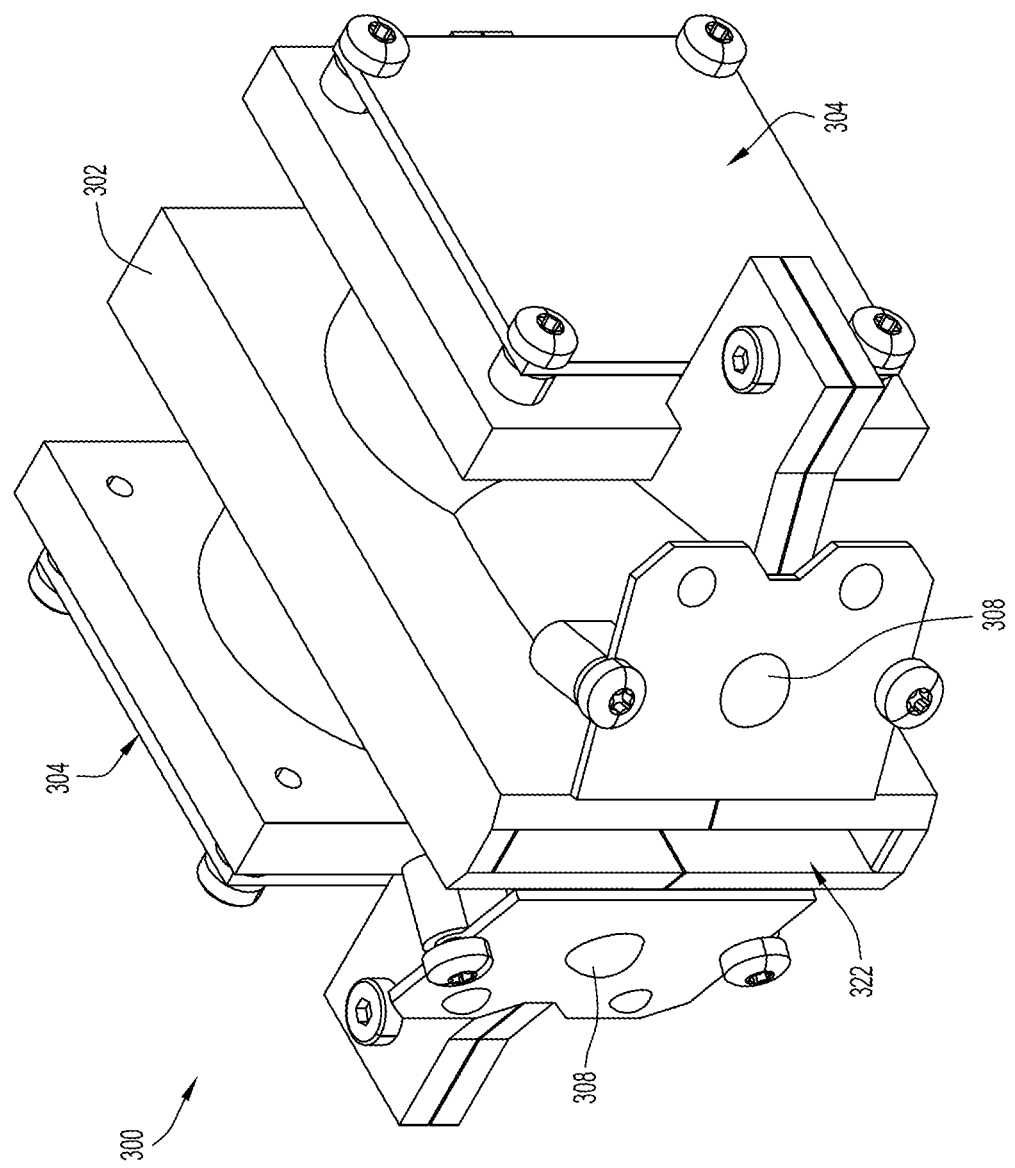
FIG. 4A is a front perspective view of the reader of FIG. 3A.
Figure 4C:
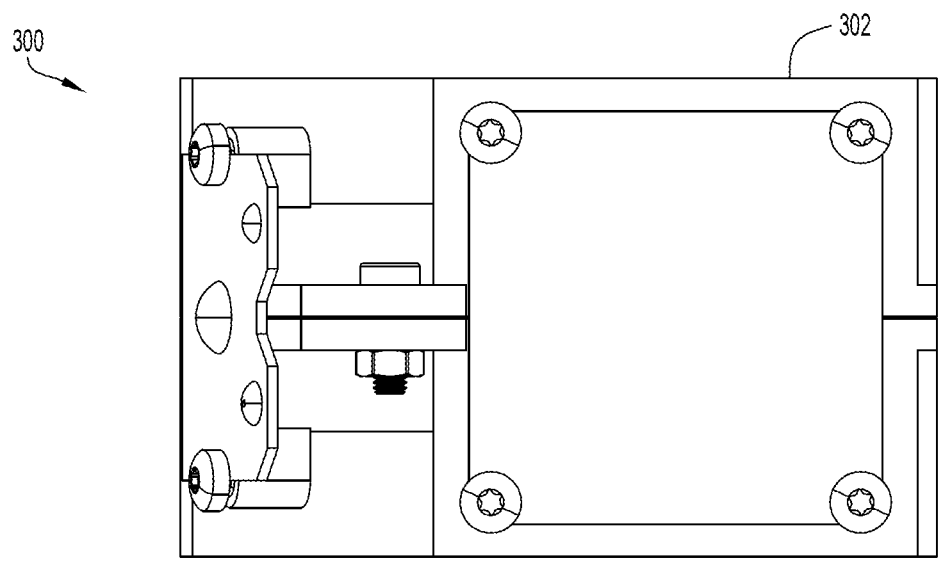
FIG. 4C is a side view of the reader of FIG. 4A.
Figure 4D:
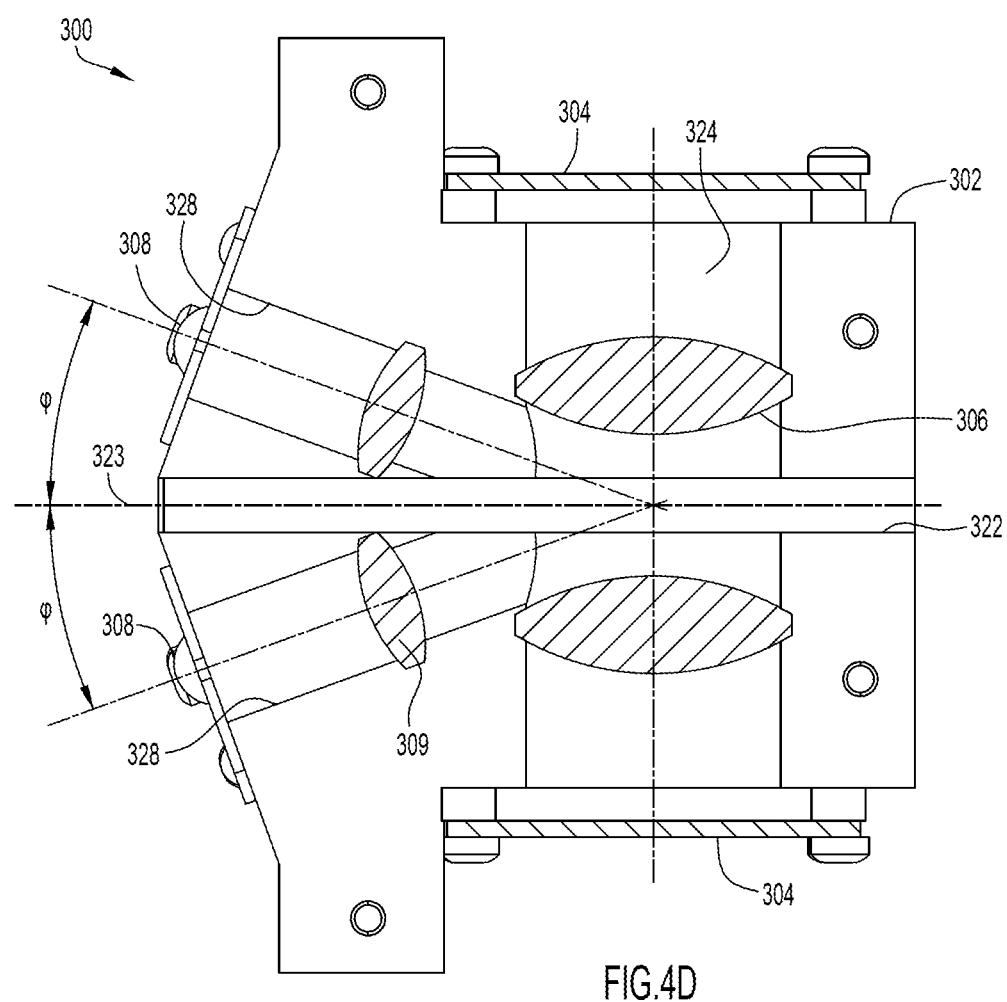
FIG. 4D is a cross-sectional view of the reader of FIG. 4A, taken along line A-A of FIG. 4C.

Now referring to FIGS. 4A-4D, an example embodiment of the reader 300 of FIGS. 3A and 3B is depicted. FIG. 4A depicts a perspective view of the reader 300 according to an example embodiment and FIG. 4B is an exploded view of the reader 300 of FIG. 4A. Then, FIG. 4C is a side view of the reader 300 of FIG. 4A and, finally, FIG. 4D is a cross-sectional view of the reader 300 taken along line A-A in FIG. 4C.

The reader 300 includes a reader housing 302, two sensors 304 disposed on opposite sides of the reader housing 302 and two light sources 308. The reader housing 302 defines a wire channel 322 for guiding consumable wire (e.g., wire 200 of FIGS. 2, 3A, and 3B) along a wire path 323 through the reader 300 and between the two sensors 304. The light sources 308 emit light into the reader housing 302 to illuminate an outer surface of the wire as it passes between the sensors 304 (See FIGS. 3A and 3B).

In some implementations, the wire channel 322 may include one or more plates with one or more through holes for guiding the wire along the wire path 323. Additionally, or alternatively, the wire may be viewed through the one or more through holes by the sensors 304. The plate may also block excess light from shining into the wire channel 322 and being detected by the sensors 304. Additionally, internal surfaces of the wire channel 322 may be painted or otherwise coated with light absorbing material. Thus, a majority of the light detected by the sensors 304 is emitted from the light sources 308 and reflected by the markings. Light absorbing materials may also stray reflections.

The light emitted from one of the light sources 308 may be incident on the outer surface of the wire at an askew angle φ as the wire passes through the wire channel 322. The sensors 304 detect the markings on the outer surface of the wire illuminated by the light sources 308. That is, the light incident on the outer surface of the wire reflects off the wire markings towards the sensors 304. Only a portion of the light (e.g., light incident on markings 210 of wire 200) is reflected towards at least one of the sensors 304 due to the askew angle φ, thereby reducing glare and making the marking appear bright. Said another way, light incident on unmarked portions of the wire 200 reflects away from the sensors 304 due to the askew angle φ, making the unmarked portions appear dark. Therefore, the sensors 304 can distinguish marked portions of the wire from unmarked surface portions of the wire. In some implementations, the light sources 308 may be light emitting diodes (LED), fiber optic cables transmitting light from an electromagnetic radiation emitter disposed exteriorly of the reader 300, or any other source of electromagnetic radiation (e.g., a laser). The electromagnetic radiation may be visible and/or invisible (e.g., infrared radiation, ultraviolet radiation, etc.), and may be a single frequency or a plurality, or spectrum, of frequencies.

Regardless of the type of light sources 308, the reader 300 aligns the light sources 308, wire 200, and sensors 304. Referring to FIG. 4B, an exploded view of the reader 300 is illustrated. The reader housing 302 includes a first half 302A, (e.g., top half) and a second half 302B (e.g., bottom half). The first half 302A and the second half 302B cooperate to define a wire channel 322 defining the wire path 323, sensor channels 324, and light channels 328.

The wire channel 322 extends along the reader housing 302 and is disposed between the sensors 304 and the light sources 308. The sensor channels 324 extends along the reader housing 302 perpendicular to and intersecting with the wire channel 322. The sensor channels 324 define a field of view of the sensors 304. The sensor channels 324 may further support sensor lenses 306 for focusing light reflected from the wire towards respective sensors 304. Additionally, the light channels 328 extend along the reader housing 302 and intersect the wire channel 322 at an askew angle φ within the plane of the sensors 304 and the wire. The light channels 328 may support optical lenses 309 for focusing light from respective light sources 308 onto a wire as it passes through the wire channel 322.

In some implementations, the askew angle φ between a light channel 328 and the wire channel 322 may be about 20 degrees. For example, the askew angle φ may be 5 degrees, 10 degrees, 15 degrees, 20 degrees, 25 degrees, 30 degrees, or otherwise within a range from 5 degrees to 30 degrees. In some implementations, each light channel 328 may be arranged at different askew angles with respect to the wire channel 322. For example, a first light channel may be arranged 30 degrees with respect to the wire channel 322, while a second light channel may be arranged at 25 degrees with respect to the wire channel 322. As noted above, the askew angle φ improves the sensors' ability to detect markings on the outer surface of the wire 200.

Additionally, or alternatively, the reader 300 may include a transparent cylinder that guides the wire along the wire path 323. The sensors 304 may read the marked wire through the transparent cylinder. The transparent cylinder may protect the reader 300 and internal components (e.g., sensors 304, light sources 308, lenses 306, etc.) from dirt, oil, and/or other contaminants. The transparent cylinder may be removably coupled to the reader 300. A user may remove the transparent cylinder for cleaning and/or replace the transparent cylinder with a new transparent cylinder. In some implementations, the reader 300 may include rollers to guide the wire along the wire path 323

Figure 5A:
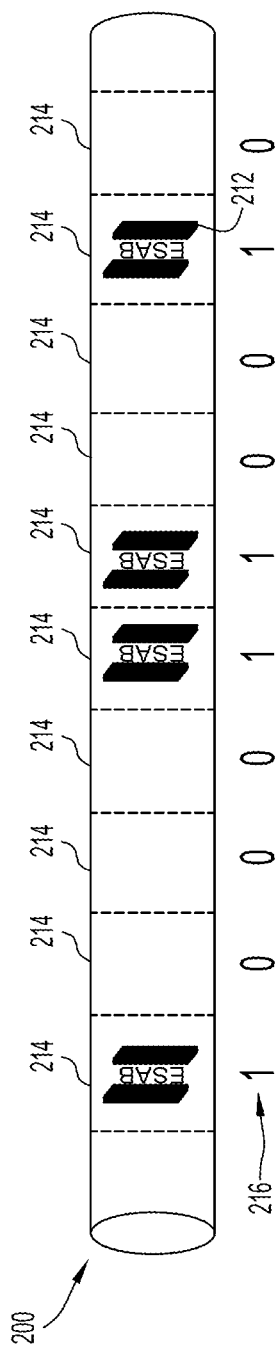
FIG. 5A illustrates a first coding scheme for marking a wire, according to an example embodiment.
Figure 5B:
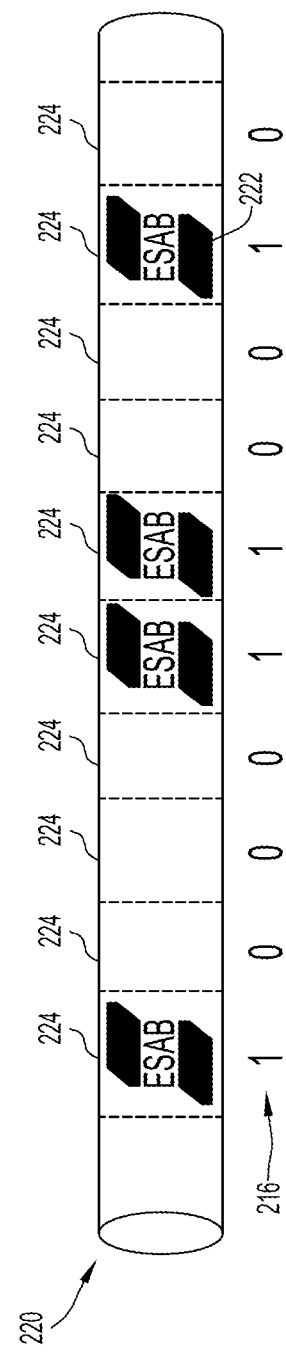
FIG. 5B illustrates a second coding scheme for marking a wire, according to an example embodiment.

FIGS. 5A-5C depict a scheme for detecting and decoding marks from a marked wire 200. As depicted in FIGS. 5A and 5B, a wire 200 is either marked with a mark 212 or unmarked at predetermined intervals 214, insofar as the term "interval" is presently used to describe "marking slots," within which a mark 212 may be included, e.g., as opposed to the space between marks 212. In some instances, if an interval 214 is marked (i.e., includes a mark 212), the reader (e.g., 300) outputs a first value (e.g., 1). If the interval is determined to be unmarked, the reader outputs a second value (e.g., 0). Alternatively, the first value (e.g., 1) may correspond to an unmarked interval, and the second value (e.g., 0) may correspond to a marked interval. Still further, in some implementations, an interval may have a first marking (e.g., a single line) corresponding to a first value (e.g., 1) and another interval may have a second marking (e.g., two lines) corresponding to a second value (e.g., 2). That is, the markings may not be representative of a binary code or logic bit, but any number of possibilities may be utilized for each logic bit (e.g., binary logic, ternary logic, quaternary logic, quinary logic, etc.).

A set of intervals 214 may be used to generate a code 216. FIG. 5A illustrates a ten (10) interval set included on a wire that can be used to generate a 10-bit code (e.g., 1000110010). This 10-bit code may be indicative of any number of parameters, or characteristics, of the wire, including a remaining length of wire in the carrier, wire type, wire material, wire gauge or thickness, wire manufacturer, lot number, weld power settings (e.g., current and voltage), gas flow rates, authentication, etc. In some implementations, the code 216 may include a reference number that is usable with a look-up table stored in the microprocessor, power source, wire feeder, and/or in a server remote to the welding system. The look-up table may include a plurality of reference numbers corresponding wire information. In yet another implementation, the code 216 could also be a combination of raw information or data and a reference value. For example, the "remaining length" may be encoded within the code 216 as raw data, while characteristics of and/or parameters of the wire are encoded as a reference number that is compared to a look-up table for the wire information.

Regardless of how the data is encoded, the wire may include a plurality of interval sets (e.g., where each interval set corresponds to ten (10) intervals defining a code 216) spaced apart at predetermined distances. For example, every three (3) feet of wire may have an interval set with at least one marking. While ten (10) intervals are used to generate a 10-bit code, any number of intervals may be used to generate any number of bits of code, e.g., 8, 10, 16, 32, 64, 128 or more bits.

Because the wire feed speed may vary during a welding operation, the code 216 includes markings at certain intervals to calibrate the reader to the code 216 marked on the wire 200. For example, the code 216 may include two (2) consecutive start bits to indicate initiation of the code 216 and alignment bits every four (4) to five (5) intervals to calibrate the reader's reference frame to the interval spacing.

That is, the code 216 starts with two marked intervals and includes a marked interval every four to five intervals 214 to calibrate a reference frame of the reader to the code 216. Moreover, the reader resets the reference frame of the reader every time a mark 212 is detected.

For example, when the marked wire 200 travels through the reader at a feed speed and the sensors detect the two marks 212 indicative of the start bits, the reader sets the reference frame of the reader. That is, based on the feed speed and starting marks 212, the reader determines when each interval 214 of the marked wire 200 will be within the fields of view of the sensors (i.e., a frame of reference for the reader). When an interval 214 with a mark 212 passes within the field of view of the sensors, the frame of reference of the reader is also updated. That is, the system corrects for any errors in a determined or sensed feed speed based on a detected mark 212 and updates an anticipated position(s) of the following intervals 214. Consequently, the system is constantly updating the interval 214 position prediction to prevent errors in detecting the marks 212 on the wire 200 and ensures that any errors in reading the code 216 are addressed before reading the end of the code 216.

After the anticipated number of intervals 214, the reader may determine an entirety of the interval set as passed through the reader and the code 216 has been detected. The reader transmits the detected code 216 and/or the data encoded therein to a controller/processor. The reader scans for a second set of starting marks 212 to reset its frame of reference and to scan a second code indicative of a second set of data. In some implementations, the start bits and alignment bits are part of the code 216 indicating a parameter of the wire 200. Alternatively, the start bits and alignment bits are not part of the code 216 and are only used to calibrate the reader to the code 216.

In some implementations, the reader (or connected controller) may know the distance between interval sets and the length of the interval sets. Consequently, the reader (or connected controller) may determine whether an interval set is passing through the reader based on the distance fed by the feeder. For example, a distance between intervals may be compared to a threshold, which may be predetermined, dynamically determined, or set with a user input. A first threshold may be the distance between two interval sets. If the feeder feeds a certain distance, e.g., three feet, of wire and detects no markings over the first threshold distance, the reader may determine that the code corresponds to all unmarked intervals. The feed distance may also be compared to a second threshold to determine if the wire is marked or unmarked. In the example provided above, if the feed distance is greater than twice the distance between interval sets (e.g., six feet), and the reader does not detect a mark, the reader (or controller) may determine that the wire is unmarked. However, these are just examples and, in other embodiments, any desired techniques may be used to determine if a wire is unmarked (e.g., as opposed to being marked with an all zero code). In some instances, this might mean the wire is not a genuine wire (e.g., not produced by an authorized/approved manufacturer).

The marking may be an etched, engraved, ablated, or otherwise produced line or a company logo that can also be used for authenticating the source of the wire. As shown in FIG. 5A, the logos are aligned with a width of the wire 200. This may allow portions of the logo to be read (e.g., top and bottom bars included in the logo), for example, as markings within smaller intervals (e.g., where the intervals split or otherwise extend through the logo). That is, instead of looking for a mark in an interval, the optical sensors may look for specific markings or specific portions of markings.

Alternatively, a distance between marks 212 may be used to set values for the code 216. For example, a distance of 10 mm between two marks 212 may correspond to a first value (e.g., 0), a distance of 15 mm between two marks 212 may correspond to a second value (e.g., 1), and a distance of 20 mm between two marks 212 may correspond to a third value (e.g., 2). Under this encoding arrangement, alignment bits may be omitted because the wire will include marks 212 every 10 to 20 mm of wire.

In yet another implementation, the information may be encoded using different kinds of markings for different values. For example, a mark 212 may include a double bar corresponding to a first value (e.g., 1) and a single bar corresponding to a second value (e.g., 0). In fact, the code does not have to be binary. A greater variety of marking types may provide a greater amount of information that may encoded within the code 216. For instance, with three (3) different kinds of marks 212 the code 216 could be "ternary", meaning that the full code consisting of N-lines is read out as an N-digit number in base 3. This base could be any other positive integer (4, 5, 6, etc.).

FIG. 5B illustrates another implementation of a wire 220 with marks 222 comprising logos oriented along a length of the wire 220 where the entire logo is identified within an interval 224. However, the marks 212, 222 may be oriented along any orientation. Preferably, the marks 212, 222 cover about 50% of the outer circumference of the wire 200, 220 within an interval 214, 224. In some implementations, the marks 212, 222 may be a single line extending from the top to the bottom of the wire 200, 220 along 50% of the outer circumference within an interval 214, 224.

As mentioned above, portions of the marks 212, 222 may pass through the fields of view of one or more sensors 304 (see FIGS. 3A and 3B). FIG. 5C illustrates sensor outputs from two (2), and optionally three (3) optical sensors—thus, the third sensor output is shown in parentheses—as the wire from FIG. 3A, 3B, 5A or 5B passes through the reader (e.g., two or three sensors from the reader depicted in FIG. 3A, 3B, 4A-4D, or 6). As shown in FIG. 5C each sensor detects a portion of the marking within an interval 214, 224 as it passes the field of view of the sensor. Because each sensor outputs a different signal level for each interval 214, 224, the data, or signal, from each sensor is combined at a single controller (e.g., microcontroller 310). For example, the sensors (e.g., sensor 304) may be optical sensors each outputting a pixel column.

The controller (e.g., microcontroller 310) combines the pixel columns from each sensor to produce a columnwise sum of the sensor output. Then, the controller determines whether an interval is marked if the combined signal from one set of summed pixel columns corresponding to an interval is stronger than a preset threshold (e.g., cutoff) or higher than a certain measured noise level. Thus, overall, a single controller can convert multiple sensor signals indicative of portions of a mark 212, 222 into encoded information. Moreover, in some instances, the controller can filter detections based on computed standard deviations to avoid the detection of random noise, and/or imperfections on the surface of the wire (e.g., smudges, dents, dirt, oil, nicks, scratches, etc.) Thus, the controller confirms that the wire 200 is indeed marked and the sensor output is not due to an unintentional imperfection on the surface of the wire 200.

The encoded information determined by the reader can be used for any number of purposes. As some examples, the encoded information can identify a wire type and can be transferred to a power source so that the power source knows the wire type and can set and/or restrict welding parameters accordingly. Additionally, or alternatively, the encoded information can identify the wire manufacturer or provide some type of authenticating information and can be used to authenticate/allow use of a marked wire with a power supply and/or other component(s) of the welding system (e.g., torch, wire feeder, etc.). Still further, the encoded information can track wire usage and can be used to help order new wire and/or to alert a welder whether enough wire is available for a job and tracing the type and lot of the wire used for welding certificates (among other uses).

Figure 6:
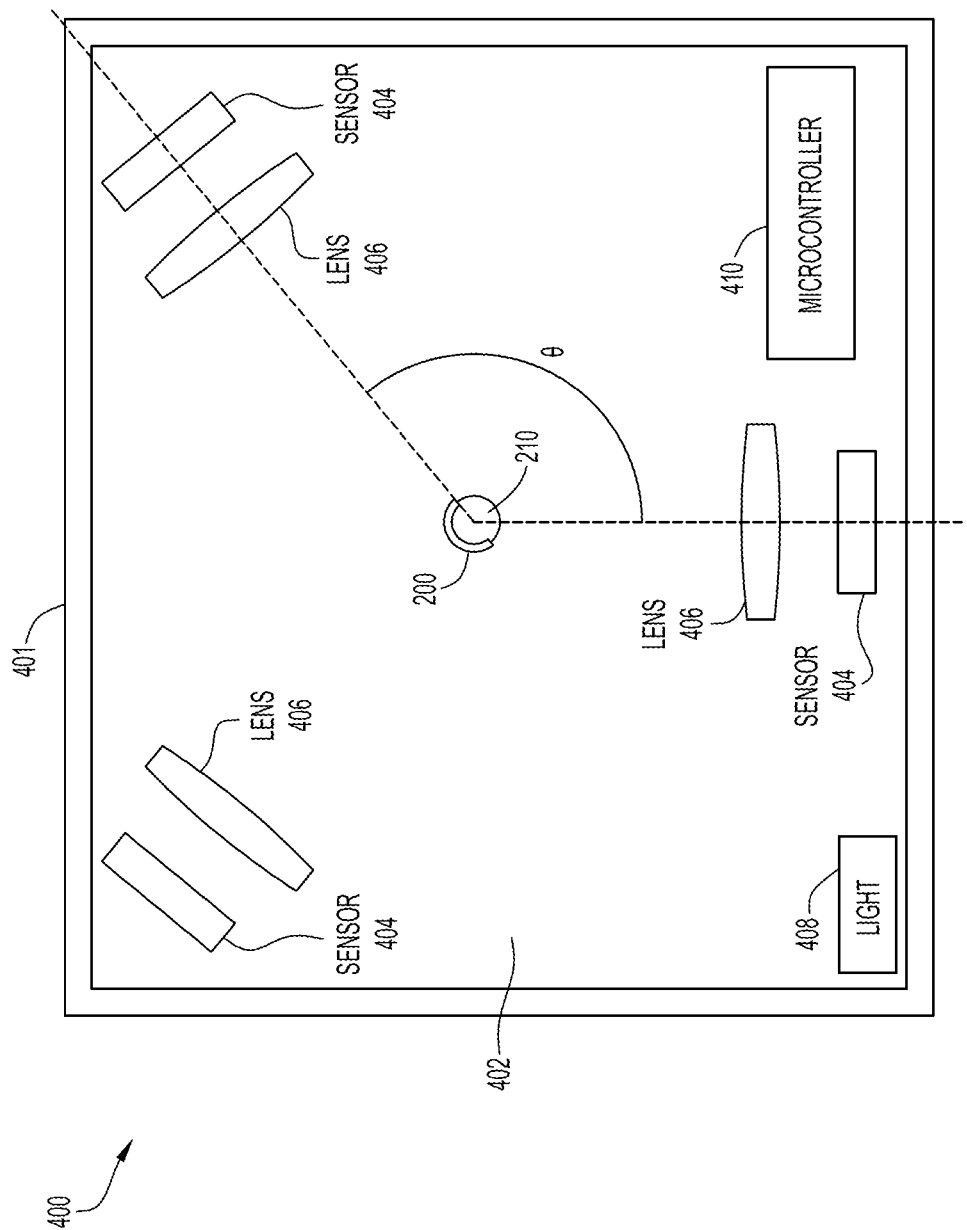
FIG. 6 illustrates a front, schematic view of a second example embodiment of a reader.

Now referring to FIG. 6, a schematic of a second example embodiment of a reader 400 is illustrated. The reader 400 includes a sensor module or box 401, a PCB 402, three (3) sensors 404, three (3) lenses 406 aligned with the sensors, at least one light source 408, and a microcontroller 410. The sensors 404, lenses 406, light 408, and microcontroller 410 are disposed on one or more PCBs 402. In some implementations, each lens 406 is combined with one of sensors 404 to form a sensor unit disposed on the one or more PCBs 402. In some implementations, the microcontroller 410 is disposed separately from the one or more PCBs 402 and/or the reader 400 (e.g., at the wire feeder). Either way, the reader/sensor module include openings for receiving a marked wire 200.

In the depicted embodiment, a PCB 402 is arranged perpendicularly to the path of the marked wire 200. The sensors 404 and lenses 406 are arranged radially about the path of the marked wire 200. For example, the sensors 404 with lenses 406 are angularly offset approximately 120° from each other. In some instances, each sensor captures approximately 50% of the circumference of the marked wire 200 as it passes through the sensor's field of view. Alternatively, each sensor 404 may capture a smaller portion of the circumference, such as 35%, 40%, 45%, etc. Regardless, when the sensors 404 capture more than approximately 33% of the circumference, there is some overlap of the field of views of the sensors 404. That is, two sensors 404 may detect a same portion of the marking that is within both sensors' fields of view. For example, the top two sensors shown in FIG. 6, may both detect markings on the top portion of the wire. However, a portion of the marking close to an edge of a field of view of a sensor 404 may be distorted because the wire surface there is almost orthogonal to the sensor's plane. Therefore, the arrangement of the optical sensors 404 (e.g., evenly spaced radially around a wire path) ensures that the reader 400 can read a marked wire 200 fed through the reader 400 regardless of the rotational orientation of the wire 200 (i.e., regardless of the angular orientation/position of a wire marking 210).

Figure 7A:
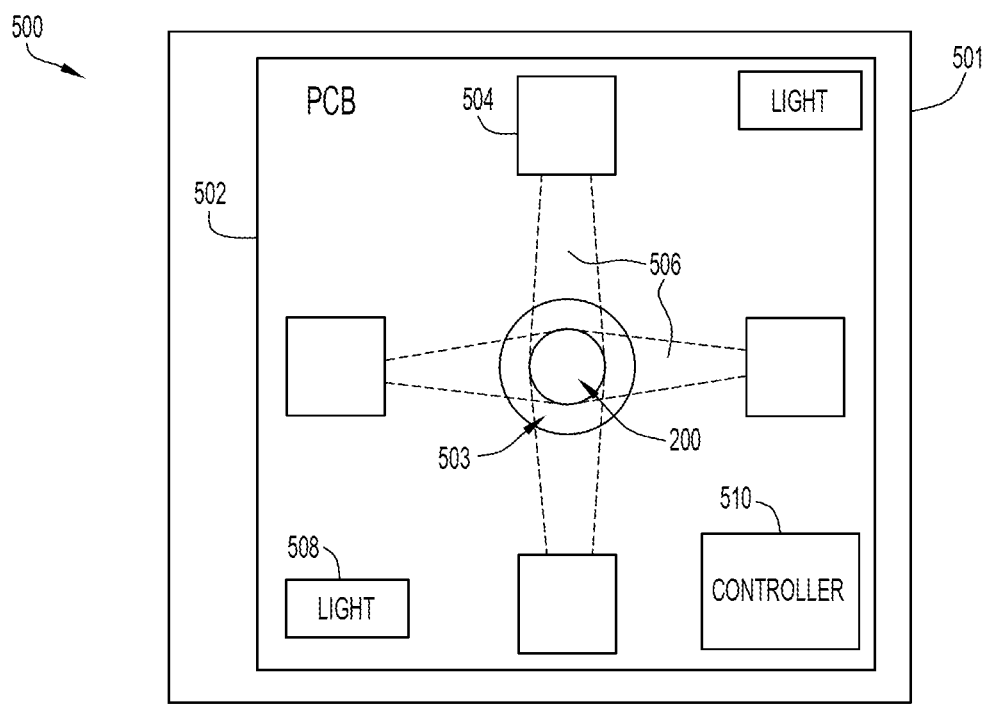
FIGS. 7A and 7B illustrate a front schematic view and a side schematic view of a third example embodiment of a reader.
Figure 7B:
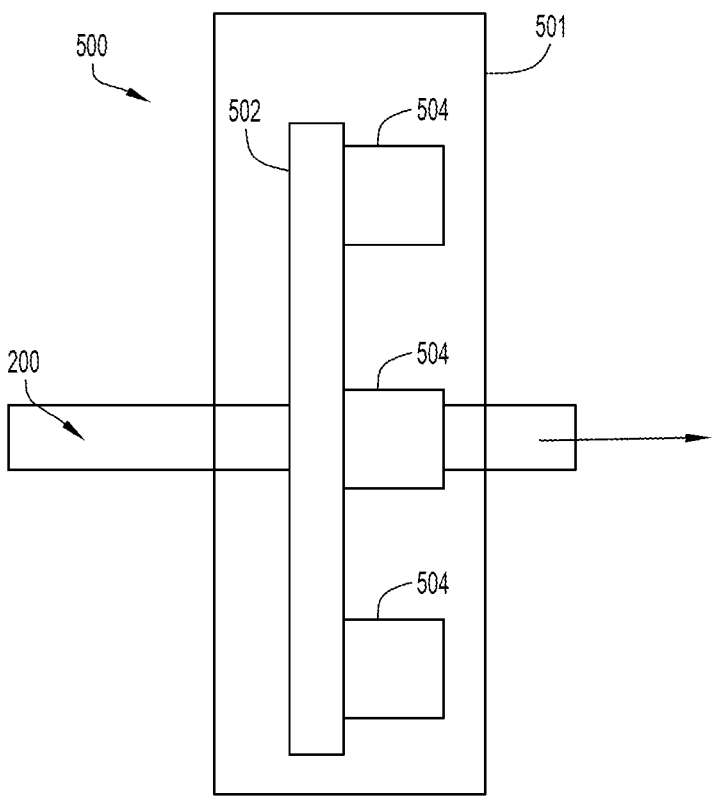

FIGS. 7A and 7B illustrate a third example embodiment of a reader 500. The reader 500 includes a sensor module 501, a PCB 502, four (4) sensors 504 with lenses (not shown), at least one light source 508, and a microcontroller 510. The sensors 504, lenses, light 508, and microcontroller 510 are disposed on one or more PCBs 502. In some implementations, each sensor 504 (each having at least one lens and an optical sensor) is disposed on its own PCBs 502. In some implementations, the microcontroller 510 is disposed separately from the one or more PCBs 502 and/or the reader 500 (e.g., at the wire feeder). In the depicted embodiment, the PCB 502 is arranged perpendicularly to the path of the marked wire 200 and, thus, the reader 500, sensor module 501, and PCB 502 include aligned openings 503 for receiving a marked wire.

As depicted in FIGS. 7A and 7B, the sensors 504 are arranged radially about the path of the marked wire 200. For example, the sensors 504 with lenses are radially offset approximately 90° from each other. In some implementations, each sensor captures approximately 50% of the circumference of the marked wire as it passes through the sensor's field of view 506. Alternatively, each sensor may capture a smaller portion of the circumference, such as 35%, 40%, 45%, etc. Regardless, when the sensors 504 capture more than approximately 25% of the circumference, there is some overlap of the field of views 506 of the sensors 504. That is, at least two sensors 504 may detect a same portion of the marking within both sensors' fields of view 506. For example, the top sensor and two side sensors as shown in FIG. 7A, may detect markings on the top portion of a wire 200. However, notably, since a portion of the marking close to an edge of a field of view 506 of a sensor 504 may be distorted (e.g., because the wire surface there is almost orthogonal to the sensor's plane), larger overlaps (e.g., more than 5 degrees of overlap) may reduce noise and/or ensure that an entire wire circumference is seen by the sensors 504.

More specifically, having at least two sensors 504 detect portions of the same mark serves as a mutual check of the sensors 504 to confirm that the wire 200 is indeed marked and not an unintentional imperfection on the surface of the wire (e.g., dirt, smudges, oils, dents, nicks, scratches, etc.). The noise reduction achieved with the aforementioned sensor arrangements is discussed above with reference to FIG. 5C. Therefore, the arrangement of the sensors 504 (e.g., spaced radially around a wire path) ensures that the reader 500 can read a marked wire 200 fed through the reader 500 regardless of the rotational orientation of the wire 200 (i.e., regardless of the angular orientation/position of a wire marking on the wire 200) while also reducing noise signals introduced by imperfections on the surface of the wire 200.

Figure 8:
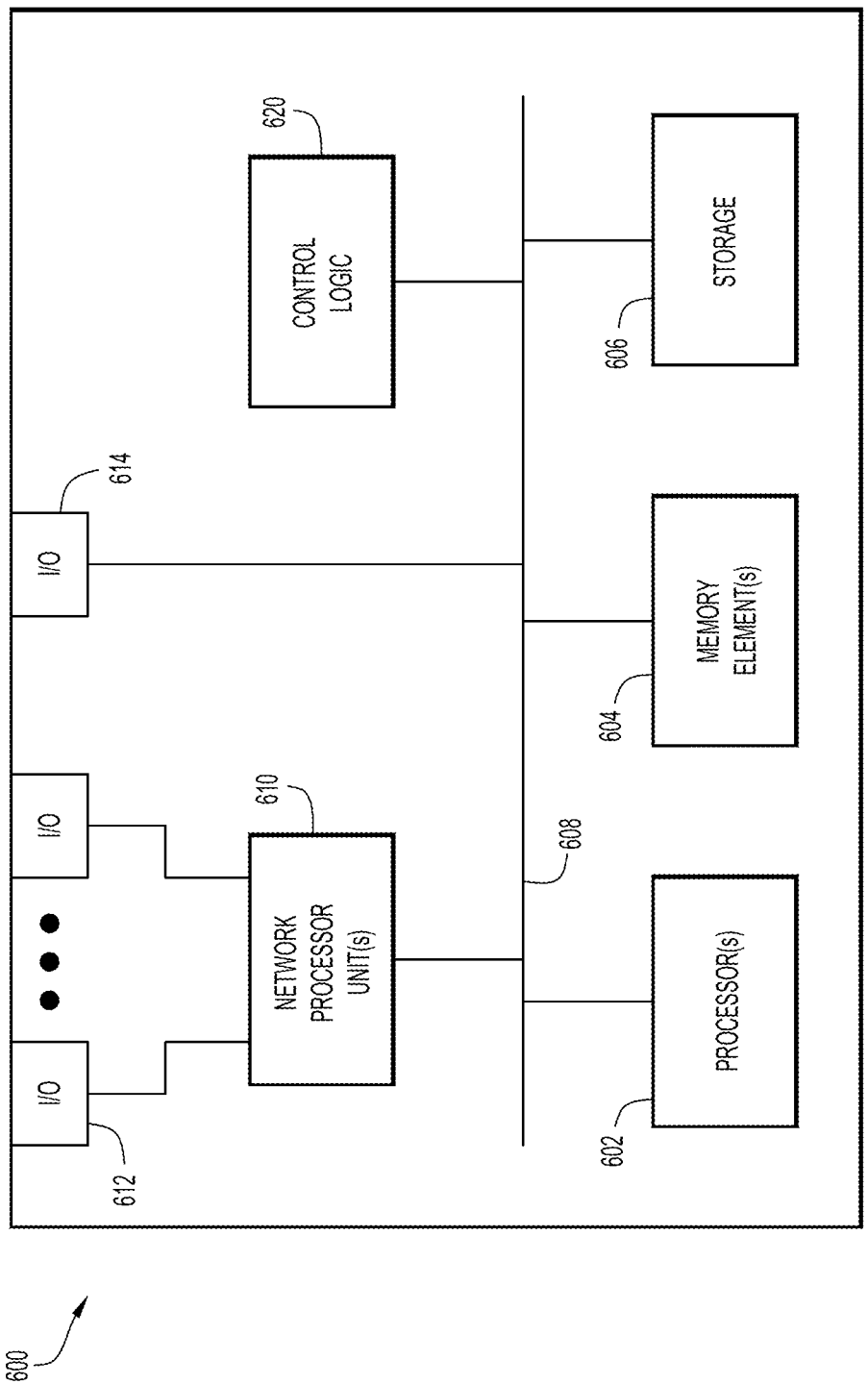
FIG. 8 illustrates a hardware block diagram of a computing device 600.

Referring to FIG. 8, a hardware block diagram of a computing device 600 is illustrated. The illustrated computing device 600 may be an example of a controller or microcontroller 310, 410, 510 as described above. The computing device 600 may perform functions associated with the operations discussed herein in connection with the techniques described herein with reference to FIGS. 5A-5C. The computing device 600 may be incorporated in any of the readers and/or arc process system discussed herein and may be configured to perform the operations discussed herein for determining information from a marked wire and/or controlling one or more parameters of the arc process operation. Thus, any of the controllers or microcontrollers 310, 410, 510 may execute the techniques presented herein, alone or in combination with one or more other systems/components.

In at least one embodiment, the computing device 600 may be any apparatus that may include one or more processor(s) 602, one or more memory element(s) 604, storage media 606, a bus 608, one or more network processor unit(s) 610 interconnected with one or more network input/output (I/O) interface(s) 612, one or more I/O interface(s) 614, and control logic 620. In various embodiments, instructions associated with logic for the computing device 600 can overlap in any manner and are not limited to the specific allocation of instructions and/or operations described herein.

In at least one embodiment, the processor(s) 602 is/are at least one hardware processor configured to execute various tasks, operations and/or functions for the computing device 600 as described herein according to software and/or instructions configured for the computing device 600. The processor(s) 602 can execute any type of instructions associated with data to achieve the operations detailed herein. In one example, the processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor".

In at least one embodiment, the memory element(s) 604 and/or the storage media 606 is/are configured to store data, information, software, and/or instructions associated with the computing device 600, and/or logic configured for the memory element(s) 604 and/or the storage media 606. For example, any logic described herein (e.g., the control logic 620) can, in various embodiments, be stored for the computing device 600 using any combination of the memory element(s) 604 and/or the storage media 606. Note that in some embodiments, the storage media 606 can be consolidated with memory element(s) 604 (or vice versa) or can overlap/exist in any other suitable manner.

In various embodiments, any entity, apparatus, or device as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad terms "memory element" and "storage media." Data/information being tracked and/or sent to one or more entities, apparatuses, or devices as discussed herein could be provided in any database, table, register, list, cache, storage, and/or storage structure: all of which can be referenced at any suitable timeframe. Any such storage options may also be included within the broad terms "memory element" and "storage media" as used herein.

Note that in certain example implementations, operations as set forth herein may be implemented by logic (as described herein; e.g., the control logic 620) encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by the one or more processor(s) 602, and/or other similar machine(s), etc. Generally, this includes the memory element(s) 604 and/or the storage media 606 being able to store data, software, code, instructions (e.g., processor instructions), logic (e.g., the control logic 620), parameters, combinations thereof, or the like that are executed to carry out operations in accordance with teachings of the present disclosure.

To the extent that embodiments presented herein relate to the storage of data, the embodiments may employ any number of any conventional or other databases, data stores or storage structures (e.g., files, databases, data structures, data, or other repositories, etc.) to store information.

In at least one embodiment, the bus 608 can be configured as an interface that enables one or more elements of the computing device 600 to communicate in order to exchange information and/or data. The bus 608 can be implemented with any architecture designed for passing control, data and/or information between the processor(s) 602, the memory elements 604, the storage media 606, peripheral devices, and/or any other hardware and/or software components that may be configured for the computing device 600. In at least one embodiment, the bus 608 may be implemented as a fast kernel-hosted interconnect, potentially using shared memory between processes (e.g., logic), which can enable efficient communication paths between the processes.

In various embodiments, the network processor unit(s) 610 may enable communication between the computing device 600 and other systems, entities, devices, etc., via the network I/O interface(s) 612 (wired and/or wireless) to facilitate operations discussed for various embodiments described herein. In various embodiments, the network processor unit(s) 610 can be configured as a combination of hardware and/or software, such as one or more Ethernet driver(s) and/or controller(s) or interface cards, Fiber Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between the computing device 600 and other arc process system devices, arc process system auxiliary components, etc. to facilitate the operations described herein. In various embodiments, the network I/O interface(s) 612 can be configured as one or more Ethernet port(s), Fiber Channel ports, any other I/O port(s), and/or antenna(s)/antenna array(s) now known or hereafter developed. Thus, the network processor unit(s) 610 and/or the network I/O interface(s) 612 may include suitable interfaces for receiving, transmitting, and/or otherwise communicating data and/or information in a network environment.

The I/O interface(s) 614 allow for input and output of data and/or information with other entities that may be connected to the computer device 600. For example, the I/O interface(s) 614 may provide a connection to arc process system devices and/or components. In some implementations, the I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, the control logic 620 can include instructions that, when executed, cause the processor(s) 602 to perform operations, which can include, but are not limited to: decoding a code read from a consumable wire, controlling the pressure of one or more fluids supplied to the torch, changing various parameters of the arc process operation; providing overall control operations of the arc process system; interacting with other entities, devices, components, systems, etc. described herein; maintaining and/or interacting with stored data, information, parameters, etc. (e.g., the memory element(s) 604, the storage media 606, data structures, databases, tables, etc.); and/or combinations thereof to facilitate various operations for embodiments described herein.

The programs described herein (e.g., the control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

While the invention has been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. For example, the above embodiments are described with reference to a wire, the system and method may be applied to other consumables such as a strip, or other type of coiled or spooled stock. In addition, various features from one of the embodiments may be incorporated into another of the embodiments. Accordingly, it is appropriate that the appended claims be construed broadly and in a manner consistent with the scope of the disclosure as set forth in the following claims.

Reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", "left," "right," "front," "rear," "side," "height," "length," "width," "interior," "exterior," "inner," "outer" or other similar terms merely describe points of reference and do not limit the present invention to any particular orientation or configuration. When used to describe a range of dimensions and/or other characteristics (e.g., time, pressure, temperature, distance, etc.) of an element, operations, conditions, etc. the phrase "between X and Y" represents a range that includes X and Y.

Further, the term "exemplary" is used herein to describe an example or illustration. Any embodiment described herein as exemplary is not to be construed as a preferred or advantageous embodiment, but rather as one example or illustration of a possible embodiment.

Further, the present disclosure may repeat reference numerals and/or letters in the various examples. This repetition is for the purpose of simplicity and clarity and does not in itself dictate a relationship between the various embodiments and/or configurations discussed.

When used herein, the term "comprises" and its derivations (such as "comprising", "including," "containing," etc.) should not be understood in an excluding sense, that is, these terms should not be interpreted as excluding the possibility that what is described and defined may include further elements, steps, etc. Meanwhile, when used herein, the term "approximately" and terms of its family (such as "approximate," etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the similar terms, such as, but not limited to, "about," "around," and "substantially."

As used herein, unless expressly stated to the contrary, use of the phrase "at least one of", "one or more of", "and/or", and variations thereof are open-ended expressions that are both conjunctive and disjunctive in operation for any and all possible combination of the associated listed items. For example, each of the expressions "at least one of X, Y, and Z", "at least one of X, Y, or Z", "one or more of X, Y, and Z", "one or more of X, Y, or Z", and "X, Y, and/or Z" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Further as referred to herein, "at least one of" and "one or more of" can be represented using the "(s)" nomenclature (e.g., one or more element(s)).

Additionally, unless expressly stated to the contrary, the terms "first", "second", "third", etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, "first X" and "second X" are intended to designate two "X" elements that are not necessarily limited by any order, rank, importance, temporal sequence, or hierarchy of the two elements.

The invention claimed is:

1. A reader for detecting marks on a consumable wire comprising:
    a reader housing defining a wire channel;
    a first sensor disposed toward a first side of the wire channel; and
    a second sensor disposed toward a second side of the wire channel, opposite the first side,
    wherein the first sensor and the second sensor are configured to detect marks on a wire when light is incident on the wire.

2. The reader of claim 1, wherein the light is incident on the wire at an askew angle.

3. The reader of claim 1, wherein the first sensor includes a first field of view, and the second sensor includes a second field of view.

4. The reader of claim 3, wherein the first field of view and the second field of view are each disposed perpendicular to the wire channel.

5. The reader of claim 1, wherein the first sensor and the second sensor each comprise an optical sensor.

6. The reader of claim 1, further comprising a first lens disposed between the first sensor and the wire channel and a second lens disposed between the second sensor and the wire channel.

7. The reader of claim 1, further comprising a first light source and a second light source, wherein the first and second light sources comprise:
    optical fibers transmitting light from an emitter, or
    light emitting diodes.

8. A system comprising:
    a plurality of sensors disposed radially about a wire channel;
    a plurality of light channels configured to guide light to the wire channel; and a controller electrically coupled to the plurality of sensors and configured to:
  aggregate signal outputs of the plurality of sensors; and
  convert the aggregated signal outputs into encoded information.

9. The system of claim 8, wherein the encoded information is representative of information about a consumable wire including at least one of a wire type, a wire manufacturer, authenticating information, a remaining amount of wire from a wire supply, a wire thickness, a wire material, and a wire speed.

10. The system of claim 8, wherein the plurality of sensors, the wire channel, and the plurality of light channels are disposed in a reader housing.

11. The system of claim 10, wherein the controller is disposed in the reader housing or another welding component connected to the system.

12. The system of claim 8, wherein the controller is further configured to transmit the encoded information to at least one of a wire feeder and a power supply.

13. The system of claim 8, wherein the plurality of light channels guide light to the wire channel at an askew angle.

14. A method of determining encoded information from a marked wire comprising:
  detecting, via a plurality of sensors, marks on a wire traveling through a reader;
  outputting sensor signals from the plurality of sensors to a controller;
  aggregating, via the controller, the sensor signals from the plurality of sensors; and
  determining encoded information representative of a characteristic of the wire.

15. The method of claim 14, wherein the characteristic of the wire comprises at least one of a wire type, a wire manufacturer, authenticating information, remaining amount of wire from a wire supply, a wire thickness, a wire material, and a wire speed.

16. The method of claim 14, further comprising detecting a start of the encoded information from the marked wire.

17. The method of claim 16, further comprising detecting an alignment mark from the marked wire.

18. The method of claim 17, wherein the alignment mark is detected four or five intervals after a detected mark of the encoded information from the marked wire.

19. The method of claim 16, wherein the determined encoded information comprises at least 64 bits, and detecting the start of the encoded information comprises detecting two sequential marks on the wire.

20. The method of claim 14 wherein the encoded information is determined from an interval along the marked wire, wherein an interval with a mark is considered a logically positive bit, and an interval without a mark is considered a logically negative bit.

* * * * *